Sept. 9, 1947. W. J. GRABNER 2,427,133
WORK HOLDING AND FABRICATING APPARATUS
Filed Nov. 17, 1943 2 Sheets-Sheet 1
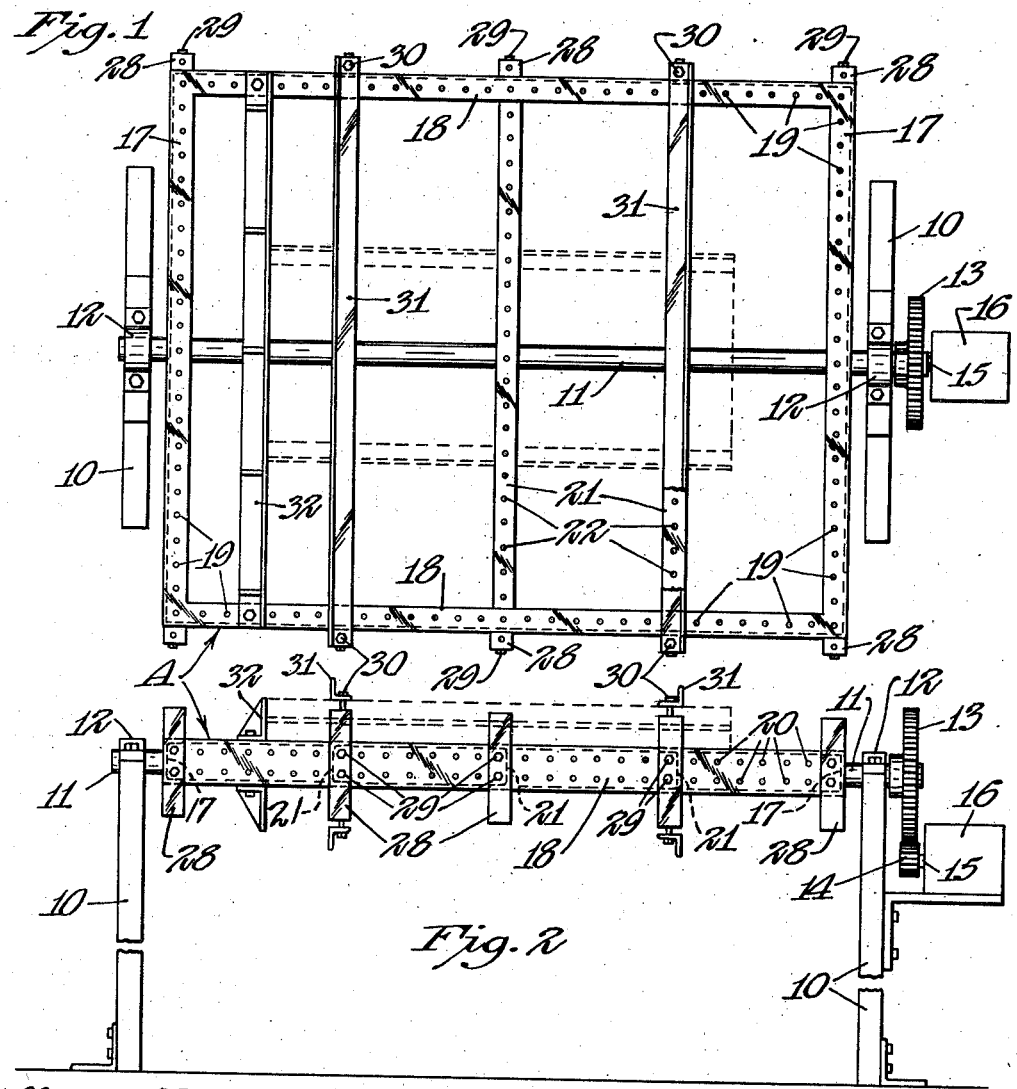
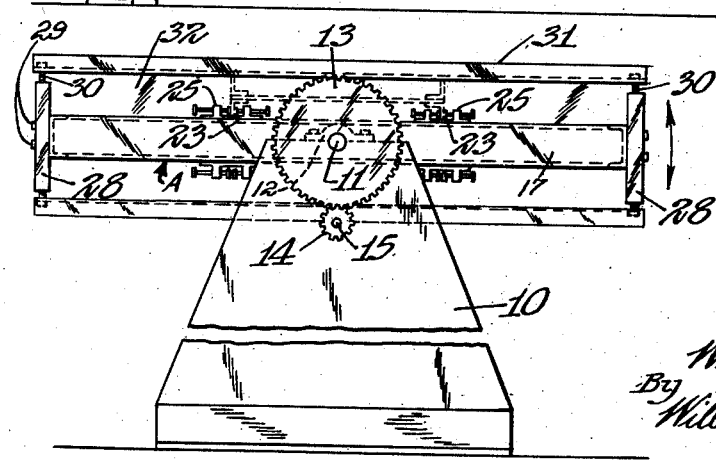
Inventor
Walter J. Grabner
By Williamson & Williamson
Attorneys Sept. 9, 1947.  W. J. GRABNER  2,427,133
WORK HOLDING AND FABRICATING APPARATUS
Filed Nov. 17, 1943  2 Sheets-Sheet 2
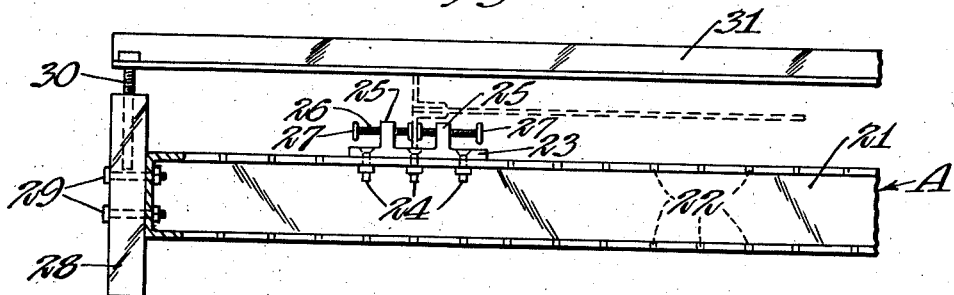
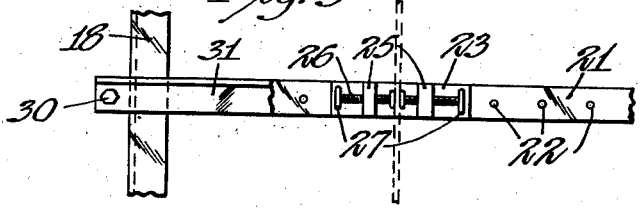
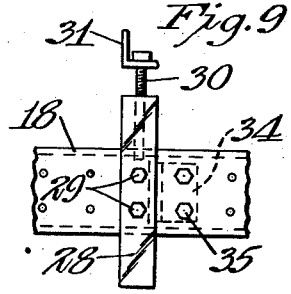
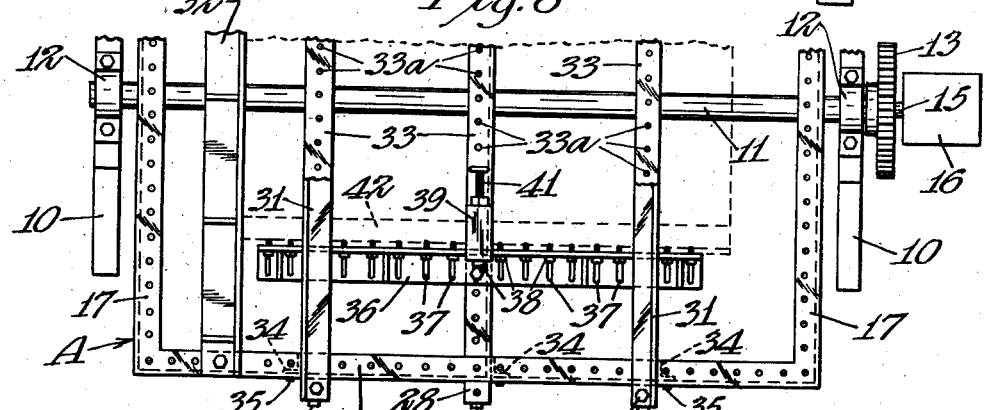
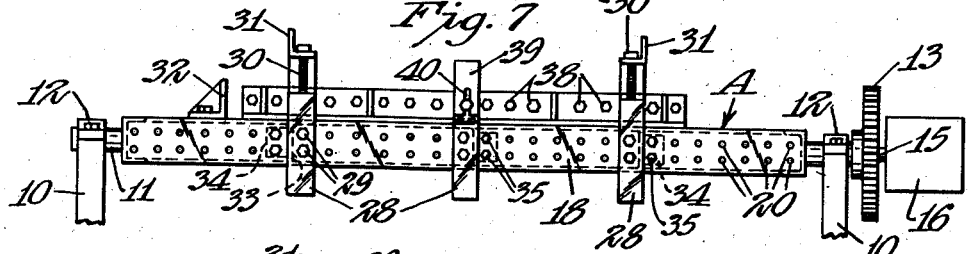
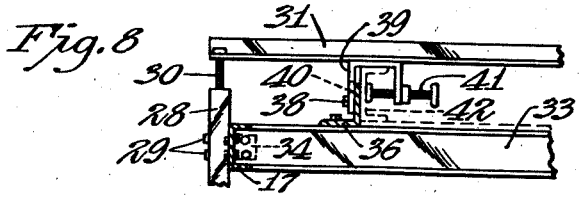
Inventor
Walter J. Grabner
By Williamson & Williamson
Attorneys Patented Sept. 9, 1947

2,427,133

UNITED STATES PATENT OFFICE 2,427,133

WORK HOLDING AND FABRICATING APPARATUS

Walter J. Grabner, Minneapolis, Minn.

Application November 17, 1943, Serial No. 510,646

6 Claims. (Cl. 29—288)

1

This invention relates to work holding apparatus which is adapted for use in securing structural elements and the like in various positions and maintaining said elements in their proper relative positions so that they can be united by welding, riveting and the like. The work holding apparatus is also designed to hold materials for cutting and grinding operations and the like where it is necessary to hold the work so that the several operations can be performed thereon.

It is a general object of the invention to provide work holding and fabricating apparatus which includes a main frame supported for rotation to present either side of the frame in an upwardly disposed position and to provide work clamping means in conjunction with the frame so that pieces of work can be attached to one or both sides thereof.

Another object of the invention is to provide a work holding frame which is substantially open within the outer limits of the frame so that a piece of work can be clamped thereon, the upper side of the work operated upon and the frame then rotated 180 degrees so that the lower side of the work is presented uppermost so that it in turn can be worked upon removing the work from the frame.

A further object of the invention is to provide apparatus of the class described above with work clamping means adapted to grip the sides or ends of a piece of work and also to provide hold-down means to pull the work tightly against the frame.

Still a further object of the invention is to provide the above noted clamping and hold-down means which can be adjustably positioned relative to the frame to effectively clamp and hold different types and sizes of work.

Another object of the invention is to provide a work supporting frame with clamping means thereon and also to provide a jig which is adjustably mounted on the frame and which can be utilized to square the ends of the work where said work is made up of a plurality of pieces which must have certain definite relative positioning.

These and other objects and advantages of the invention will more fully appear from the following description made in connection with the accompanying drawings, wherein like reference characters refer to the same parts throughout the views, and, in which:

Fig. 1 is a plan view of the apparatus with the material to be worked upon shown in dotted lines;

Fig. 2 is a side elevation thereof;

Fig. 3 is an end view of the apparatus with the driving motor removed;

2

Fig. 4 is an enlarged fragmentary detail of a portion of the frame showing the work clamping means and the hold-down means with the work in dotted lines;

Fig. 5 is an enlarged fragmentary top view of the work in dotted lines showing the clamping means and a portion of the hold-down bar;

Fig. 6 is a fragmentary plan view of the main frame with the addition of an adjustable anchoring bar and a modified form of clamping means;

Fig. 7 is a side elevation of the device shown in Fig. 6;

Fig. 8 is a fragmentary view showing the clamping means of Figs. 6 and 7 in side elevation and the anchoring bar in section; and Fig. 9 is an enlarged fragmentary detail of a portion of a frame side member and the adjustable anchoring post for the work hold-down means.

In Figs. 1 through 3 there is shown a pair of upright supports 10 between which is mounted a shaft 11 which is secured to the uprights 10 in bearings 12. As viewed in Figs. 1 and 2 the right-hand end of the shaft 11 extends through its adjacent upright 10 and on the end of said shaft is a relatively large gear 13 which is in mesh with a smaller gear 14, the latter being mounted on a shaft 15 driven by a suitable motor 16.

Mounted upon the shaft 11 for rotation therewith is a main work supporting frame A which includes a pair of end members 17 and side members 18 all of which are preferably channel shaped and provided with a plurality of holes 19 in the upper and lower channel flanges. The vertical webs of the channels comprising the end and side members 17 and 18 are provided with a series of spaced holes 20. Intermediate the end frame members 17 are transversely disposed cross channels 21 having spaced apertures 22 therein. The transverse members 21 may be secured to the side frame channels 18 by any suitable means such as bolting. Mounted upon one or more of the intermediate transverse members 21 is a block 23, and said block is secured to said transverse members 21 by means of suitable nutted bolts 24 which permit said block 23 to be shifted along the transverse members 21 to any desired position. (While I have described the structure in Figs. 4 and 5 as showing intermediate transverse members 21, said blocks 23 can also be adjustably positioned on the frame end members 17 or side members 18 since the holes in said end and side members are spaced the same as those in the intermediate transverse members 21.)

The block 23 has a pair of upstanding lugs 25,

The lugs 25 have horizontally disposed threaded apertures which are adapted to receive threaded clamping bolts 26, the outer ends of which are provided with handles 27 to permit them to be easily turned. As best shown in Figs. 4 and 5, the bolts 26 can be turned so that they will approach each other to clamp a piece of work between them, the work being shown in dotted lines.

As best shown in Figs. 2 and 3, a plurality of posts 28 are secured to the vertical webs of the side frame members 18 by means of bolts 29 which are adapted to fit in vertically disposed pairs of holes 20 in said vertical webs of said frame side members 18. As shown in the drawings, the upper ends of the posts are adapted to receive threaded bolts 30 which extend through transversely disposed angle irons 31 to provide work hold-down members for drawing the work toward the main frame A, said work being shown in dotted lines. While it is not shown in the drawing it should be understood that the lower ends of the posts 28 are provided with threaded sockets to receive duplicate sets of hold-down bars 31 and bolts 30 as described above in connection with the upper side of the frame.

At the left-hand end of the frame is shown a transverse bar or work end square jig 32 which, as indicated in Figs. 1 and 2, can be moved longitudinally of the frame to provide a transversely squared abutment against which two or more pieces of work can be placed so that said pieces of work will be properly squared or lined up. A squaring member 32 can also be placed on the under side of the frame since the lower horizontal flanges of the frame member are provided with holes or apertures 19 as described above.

In Figs. 6 through 9 there is shown a modified form of the apparatus. The rectangular frame A is the same frame as that disclosed in Figs. 1 through 3. However, the intermediate transverse members 33 which are similar to the transverse members 21 in the first described embodiment are longitudinally adjustable along the frame A and are secured to the side members 18 of the frame by means of angle brackets 34 which are bolted to the transverse members 33 and also to the frame side members 18 by means of bolts 35 which fit into the apertures 20 in the vertical web portions of the frame side members 18. The frame is provided with posts 28, transverse hold-down members 31 and hold-down bolts 30 as in Figs. 1 through 3, and the frame is also provided with a work end squaring member 32.

Mounted upon two or more of the longitudinally adjustable intermediate transverse members 33 is an anchoring bar 36 which, as best shown in Fig. 8, is made of angle iron. Its horizontal portion is provided with elongated slots 37 which permit adjustment of the bar toward and away from the longitudinal center of the frame A to provide for location of the bar 36 at different positions between the holes 33a in the adjustable transverse members 33. The vertical portion of the anchoring bar 36 is provided with a plurality of spaced stud bolts 38 therein. A substantially U-shaped clamp 39 is provided with a series of slots 40 so that the left-hand arm of said clamp 39 can be slipped over one of said bolts 38 and tightened in a suitably adjustable position. The right-hand end of said U-shaped clamp 39 is provided with a bolt 41 which can be turned toward the left-hand arm of said clamp 39 to engage and clamp a piece of work 42 shown in dotted lines in Fig. 8.

From the foregoing description it will be seen that I have provided work supporting and holding apparatus which is particularly useful in fabricating structural units from two or more parts as well as for performing different types of operations such as cutting and trimming previously assembled structural units.

The device is one upon which work can be mounted and it is so constructed that the supporting frame and the work as a unit can be rotated to present the underside of the work uppermost without removing the work from the frame or changing its position thereon. The work supporting frame is so constructed that a piece of work can be placed thereon, operations performed on the upper side of the work, the supporting frame and work rotated 180 degrees to present the underside uppermost and operations then performed on said underside of the work. Then a second piece of work can be placed upon that side of the frame which was first disposed downwardly but which has been turned to provide a second upper side after the above noted 180 degree rotation. Operations can then be performed on the uppermost side of the second piece of work, the frame and work rotated another 180 degrees, the first piece of work removed and further operations then performed on the second side of the second piece of work which in the second position of the frame will be disposed upwardly.

Means is provided for gripping the work in a direction coincident with or parallel to the plane of the main supporting frame and additional means is provided in the form of a hold-down device for holding the work tightly against the frame, and, as stated above, the work clamping or gripping means and the hold-down means is intended to be applied to one and/or both sides of the frame which is rotatable to present either side of the frame uppermost. The device also includes a jig or work end squaring member which can be adjustably mounted on the frame so that two or more separate pieces of work to be assembled can be properly positioned and wherein measurement of the several work pieces can be determined from a properly aligned starting point.

I have illustrated and described alternate forms of work clamping members, but it will readily be seen that the work clamps function in the same general manner to produce equivalent advantageous results.

It should be remembered that the main frame units, the intermediate transverse members, the hold-down supporting posts and the anchoring bar as well as the squaring jig are provided with bolt receiving openings which have common spacing so that a number of different relative positions can be attained without resorting to special adaptors or other similar devices.

While I have shown specific means for carrying out the objects of the invention it will, of course, be understood that various changes may be made in the form, details, arrangement and proportions of the various parts without departing from the scope of my invention.

What I claim is:

1. Work holding and fabricating apparatus comprising, an open frame, cross members extending between opposite portions of said frame, certain of said cross members being shiftable to different positions along said frame, means releasably securing said cross members in said above mentioned different positions along said frame, work clamps mounted on said cross members and shiftable to different positions thereon, posts extending outwardly and generally perpendicularly to the plane of said frame at opposite sides thereof, hold-down members extending between oppositely disposed pairs of said posts, and connections between said posts and said hold-down members, said connections permitting movement of said hold-down members relative to said posts and toward and away from the plane of said frame.

2. Work holding and fabricating apparatus comprising, an open frame, intermediate frame members extending between opposite portions of said frame and shiftable to different positions along said frame, means releasably securing said intermediate members in said above mentioned different positions along said frame, work clamps mounted on said intermediate frame members and shiftable to different positions therealong, posts extending outwardly from and generally perpendicularly to the plane of said frame at opposite sides thereof, hold-down members extending between oppositely disposed pairs of said posts, and connections between said posts and said hold-down members, said connections permitting movement of said hold-down members relative to said posts and toward and away from the plane of said frame.

3. Work holding and fabricating apparatus comprising, an open frame, intermediate frame members extending between opposite portions of the frame and shiftable to different positions along said frame, means releasably securing said intermediate members in said above mentioned different positions along said frame, work clamps mounted on said intermediate frame members and shiftable to different positions therealong, posts extending outwardly from and generally perpendicularly to the plane of said frame at opposite sides thereof, said posts being shiftable to different positions along opposite sides of said frame, hold-down members extending between oppositely disposed pairs of said posts, and connections between said posts and said hold-down members, said connections permitting movement of said hold-down members relative to said posts and toward and away from the plane of said frame.

4. The structure in claim 3, and said hold-down members being positioned outwardly from the plane of said frame and beyond said work clamps.

5. Work holding and fabricating apparatus comprising, an open frame, a substantially horizontal pivotal mounting for said frame, cross frame members extending between opposite portions of said frame and shiftable to different positions along said frame, means releasably securing said cross members in said above mentioned different positions along said frame, work clamps mounted on opposite sides of said cross members and shiftable to different positions therealong, posts extending in opposite directions outwardly from and generally perpendicularly to the plane of said frame and being mounted on opposite sides of the frame, said posts being shiftable to different positions along said opposite sides of said frame, hold-down members extending between oppositely disposed pairs of said posts and at each end of each of said posts, and connections between said posts and said hold-down members, said connections permitting movement of said hold-down members relative to said posts and toward and away from the plane of said frame.

6. Work holding and fabricating apparatus comprising, an open frame, cross members extending between opposite portions of said frame, certain of said cross members being shiftable to different positions along said frame, means releasably securing said cross members and said above mentioned different positions along said frame, hold-down members extending between opposite side portions of said frame, said hold-down members being shiftable along said frame, means for clamping said hold-down members in various positions along the frame, said hold-down members being located outwardly from the plane of said frame, and said hold-down members having work engaging portions shiftable toward and away from the plane of said frame.

WALTER J. GRABNER.

REFERENCES CITED

The following references are of record in the file of this patent:

UNITED STATES PATENTS

| Number | Name | Date |
| --- | --- | --- |
| 2,188,433 | Friese | Jan. 30, 1940 |
| 1,750,200 | Spahn | Mar. 11, 1930 |
| 1,380,573 | Manley | June 7, 1921 |
| 1,834,294 | Spahn | Dec. 1, 1931 |
| 929,045 | Stewart | July 27, 1909 |
| 379,321 | Moyer | Mar. 13, 1888 |
| 1,648,409 | Kuney | Nov. 8, 1927 |
| 2,301,636 | Nicol | Nov. 10, 1942 |
| 1,709,128 | Gurian | Apr. 16, 1929 |
| 506,431 | Henshaw | Oct. 10, 1893 |
| 1,949,007 | Butler | Feb. 27, 1934 |
| 602,844 | Felsche | Apr. 26, 1898 |
| 2,333,450 | Staley | Nov. 2, 1943 |
| 1,326,147 | Carswell et al. | Dec. 23, 1919 |
| 1,283,588 | Staley | Nov. 5, 1918 |
| 1,469,734 | Staley | Oct. 2, 1923 |
| 1,481,503 | Carswell et al. | Jan. 22, 1924 |
| 1,600,835 | Manley | Sept. 21, 1926 |
| 1,792,612 | Staley | Feb. 17, 1931 |